(12) United States Patent
Mun et al.

(10) Patent No.: US 7,149,022 B2
(45) Date of Patent: Dec. 12, 2006

(54) OPTICAL SCANNER WITH CURVED MIRROR AND METHOD OF MANUFACTURING THE SAME

(75) Inventors: Yong-kweun Mun, Gyeonggi-do (KR); Ju-hyun Lee, Seoul (KR); Young-chul Ko, Gyeonggi-do (KR); Jin-ho Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 88 days.

(21) Appl. No.: 10/872,480

(22) Filed: Jun. 22, 2004

(65) Prior Publication Data
US 2004/0263938 A1 Dec. 30, 2004

(30) Foreign Application Priority Data
Jun. 24, 2003 (KR) ............. 10-2003-0041058

(51) Int. Cl.
*G02B 26/08* (2006.01)
(52) U.S. Cl. .................. 359/224; 359/291
(58) Field of Classification Search ........... 359/222, 359/223, 224, 225, 849–850, 858–859, 863–869, 359/871, 872
See application file for complete search history.

(56) References Cited

U.S. PATENT DOCUMENTS

| 5,999,306 A * | 12/1999 | Atobe et al. ............ 359/295 |
| 6,201,628 B1 * | 3/2001 | Basiji et al. ............ 359/212 |
| 2003/0035192 A1 * | 2/2003 | Mizuno et al. ........... 359/290 |
| 2003/0039089 A1 | 2/2003 | Lee et al. |

* cited by examiner

*Primary Examiner*—Euncha P. Cherry
(74) *Attorney, Agent, or Firm*—Buchanan Ingersoll & Rooney PC

(57) ABSTRACT

An optical scanner and a method of manufacturing the same are provided. The optical scanner comprises a rectangular frame, a H-shaped stage, which is linearly driven in a second direction perpendicular to a first direction of a central axis inside the frame and includes a central area positioned in a direction of the central axis and four extended areas that extend from both opposite sides of the central area parallel to the central axis, a cylindrical mirror, which is disposed on the central area and scans a laser beam incident on the surface thereof in the second direction, torsion bars, which are disposed on the central axis and support the stage by connecting the frame and the central area of the stage, and a stage driving structure, which includes driving comb electrodes formed at both long sides of the stage and fixed comb electrodes formed at corresponding sides of the frame, parallel to the first direction.

14 Claims, 16 Drawing Sheets

OPTICAL SCANNER WITH CURVED MIRROR AND METHOD OF MANUFACTURING THE SAME

BACKGROUND OF THE INVENTION

This application claims the priority of Korean Patent Application No. 2003-41058, filed on Jun. 24, 2003, in the Korean Intellectual Property Office, the disclosure of which is incorporated herein in its entirety by reference.

1. Field of the Invention

The present invention relates to an optical scanner using a curved mirror provided by a micro-electro mechanical system (MEMS) and a method of manufacturing the same, and more particularly, to an optical scanner for driving a stage with a curved mirror horizontally and for scanning light incident on the curved mirror in a wide angular range, and a method of manufacturing the same.

2. Description of the Related Art

FIG. 1 is a schematic perspective view of an optical scanner disclosed in U.S. patent application No. 2003-39089. Referring to FIG. 1, a rectangular frame 2 is formed on a substrate 1 which is formed of Pyrex glass, and a H-shaped stage 3 is positioned inside the frame 2 with a separating area therebetween. The stage 3 is suspended at a predetermined height from the substrate 1 by two supporters 4 which are positioned on a X axis. The stage 3 has a central area 31 that is directly connected to the supporters 4 crossing the separating area and four extended areas 32 that extend from the central area 31, parallel to the supporters 4 by a predetermined length. A mirror (not shown) may be formed only on the central area 31. Alternatively, the mirror may be formed on the entire surfaces of the central area 31 and the extended areas 32.

The supporters 4 have stationary support beams 42 extending from the frame 2 and torsion bars 41 that extend from the support beams 42 to the central area 31 of the stage 3, and the torsion bars 41 are deformed by the actuation of the stage 3. The torsion bars 41 are connected to a central portion of opposite sides of the central area 31 of the stage 3. The frame 2, the supporters 4, and the stage 3 form a single body. The torsion bars 41 support the seasaw motion of the stage 3 and provide a properly elastic restoring force during the actuation of the stage 3, and the frame 2 and the supporters 4 provide an electric path to the stage 3. The frame 2 includes a first partial frame 21 and a second partial frame 22 which are respectively positioned on and beneath a eutectic bonding layer 23 made of an AuSn alloy. The first partial frame 21, the stage 3, and the supporters 4 are obtained from one material substrate, e.g., one silicon wafer, through a multi-step process. Thus, the separating rectangular area exists between the first partial frame 21 and the stage 3, and the supporters 4 having the torsion bars 41 and the support beams 42 cross the separating area. Driving comb electrodes 33 are formed beneath the central area 31 and the extended areas 32 that extend from the central area 31. First fixed comb electrodes 13 are alternately disposed along with the driving comb electrodes 33 on the substrate 1 facing the central area 31 and the extended areas 32.

As shown in FIG. 1, second fixed comb electrodes 13' are positioned beside the first fixed comb electrodes 13. The second fixed comb electrodes 13' are an optional element, which is a kind of sensor for sensing the actuation of the stage 3 based on changes in electric capacitance. The first and second fixed comb electrodes 13 and 13' are supported by bases 14 and 14' positioned beneath the first and second fixed comb electrodes 13 and 13'. The base 14 and the first fixed comb electrodes 13 form a single body, and the base 14' and the second fixed comb electrodes 13' form another single body.

The above-described conventional optical scanner has a structure in which the stage 3 has the central area 31 and the extended areas 32 that extend from the central area 31 and the supporters 4 for supporting the stage 3 have the support beams 42 and the torsion bars 41 that are directly connected to the central area 31 of the stage 3. The optical scanner having the above structure performs optical scanning through the seasaw motion of a planar reflector formed on the stage. Since a restoring force generated by stiffness of a material of the structure is used as a main driving force, there is a limitation in a driving speed, a range in which driving comb electrodes move, that is, a scan range, is determined according to a seasaw angle of the stage, and the seasaw angle is limited when the stage and the substrate contact the fixed comb electrodes and driving comb electrodes, respectively.

SUMMARY OF THE INVENTION

The present invention provides an optical scanner for scanning light by the horizontal movement of a stage and a method of manufacturing the same.

The present invention also provides an optical scanner for performing high-speed linear scanning using a low driving voltage and a method of manufacturing the same.

According to an aspect of the present invention, there is provided an optical scanner comprising, the optical scanner comprising a rectangular frame; a H-shaped stage, which is linearly driven in a second direction perpendicular to a first direction of a central axis inside the frame and includes a central area positioned in a direction of the central axis and four extended areas that extend from both opposite sides of the central area parallel to the central axis; a cylindrical mirror, which is disposed on the central area and scans a laser beam incident on the surface thereof in the second direction; torsion bars, which are disposed on the central axis and support the stage by connecting the frame and the central area of the stage; and a stage driving structure, which includes driving comb electrodes formed at both long sides of the stage and fixed comb electrodes formed at corresponding sides of the frame, parallel to the first direction.

The torsion bars may have a S-shape and may form a single body with the frame and the stage.

The cylindrical mirror includes a surface with an effective arc having a central angle θ, and when light is incident on between both ends of the effective arc, the cylindrical mirror scans the light at an angle twice the central angle θ.

The effective arc is disposed along the second direction.

A groove is formed in a portion of the central area of the stage, and the mirror may be disposed on the groove.

According to another aspect of the present invention, there is provided an optical scanner comprising, the optical scanner comprising a H-shaped stage, which is linearly driven in a second direction perpendicular to a first direction of a central axis and includes a central area positioned in a direction of the central axis and four extended areas that extend from both opposite sides of the central area parallel to the central axis; a first supporter, which supports the linear actuation of the stage and includes a pair of first torsion bars that extend from the stage in the first direction, and a rectangular moving frame having a pair of first portions parallel to the first torsion bars and a pair of second portions that extend in the second direction; a stage driving structure, which includes first driving comb electrodes formed at both sides of the stage and first fixed comb electrodes formed at corresponding sides of the second portions; a second supporter, which includes a pair of second torsion bars that extend outward from each of the second portions of the first supporter in the second direction, and a rectangular fixed frame having a pair of first portions to which the second torsion bars are respectively connected and a pair of second portions that extend in the second direction; a first supporter driving portion, which includes second driving comb electrodes extending outward from the first portions of the moving frame and second fixed comb electrodes positioned to correspond to the second driving comb electrodes at corresponding sides of the second portion of the fixed frame; and a hemispherical mirror, which is disposed on the central area of the stage and scans a laser beam incident thereon in the first and second directions.

The hemispherical mirror scans an incident beam in the second direction when the stage is driven in the second direction, and scans the incident beam in the first direction when the first supporter is driven in the first direction.

The first torsion bars form a single body with the stage and the first portions of the moving frame, and the second torsion bars form a single body with the moving frame and the first portions of the fixed frame.

According to still another aspect of the present invention, there is provided a method of manufacturing an optical scanner, the method comprising (a) patterning a surface of a first substrate formed of glass and etching an area formed between a rectangular frame area and a stage area to a predetermined depth; (b) forming an oxide layer on a frame area, the stage area, and an area corresponding to a structure area between the frame area and the stage area of a second substrate which is a SOI wafer; (c) bonding a patterned surface of the first substrate on the oxide layer of the second substrate; (d) forming a photoresist having a cylindrical mirror shape on a top surface of the first substrate; (e) dry etching from the top surface of the first substrate and forming a cylindrical mirror on an area corresponding to the stage area; (f) etching a lower silicon layer of the second substrate using TMAH and forming a lower portion of the rectangular frame; (g) forming a protective layer on the second substrate to cover the cylindrical mirror; (h) dry etching an upper silicon layer of the second substrate using the oxide layer in step b) as a mask and forming an upper portion of the frame, the stage, and the structure; and (i) removing the protective layer, an intermediate oxide layer of the second substrate, and the oxide layer on the second substrate.

Step (b) may comprise forming an oxide layer on the second substrate; and patterning the oxide layer and forming a patterned oxide layer on a frame area, a stage area, and an area corresponding to the structure area between the frame area and the stage area.

Step (d) may comprise forming a photoresist on a top surface of the first substrate; patterning the photoresist on an area corresponding to the stage area; and forming the patterned photoresist as a cylindrical mirror shape by a thermal reflow process.

Step (e) may comprise dry etching the top surface of the first substrate using the photoresist having the cylindrical mirror shape as the mask and forming a cylindrical mirror on an oxide layer of the stage area; and removing the photoresist.

According to yet still another aspect of the present invention, there is provided a method of manufacturing an optical scanner, the method comprising (a) forming an oxide layer on a rectangular fixed frame area, a rectangular driving frame area, an outer area of a hemispherical mirror on a stage, and an area corresponding to a structure between the frame areas and the outer area of the hemispherical mirror of a SOI wafer substrate; (b) forming a silicon nitride layer on the substrate to expose the spherical mirror area inside the outer area of the hemispherical mirror; (c) forming a photoresist having a hemispherical mirror shape in the hemispherical mirror area on the substrate; (d) dry etching an upper silicon layer of the substrate and forming a hemispherical mirror on an area corresponding to the stage; (e) etching a lower silicon layer of the substrate using TMAH and forming a lower portion of the rectangular fixed frame; (f) forming a protective layer on the substrate to cover the spherical mirror; (g) removing the silicon nitride layer on the substrate; (h) dry etching the upper silicon layer of the substrate using the oxide layer in step a) as a mask and forming an upper portion of the frame, the stage, and the structure; and (i) removing the protective layer, an intermediate oxide layer of the substrate, and the oxide layer on the substrate.

Sep (a) may comprise forming an oxide layer on a SOI wafer substrate; and patterning the oxide layer and forming a patterned oxide layer on a rectangular fixed frame area, a rectangular driving frame area, an outer area of a hemispherical mirror on a stage, and an area corresponding to a structure between the frame areas and the outer area of the hemispherical mirror of the substrate.

Step (c) may comprise forming a photoresist on a top surface of the substrate; patterning the photoresist on an area corresponding to the hemispherical area of the stage; and forming the patterned photoresist as a hemispherical mirror shape by a thermal reflow process.

Step (d) may comprise dry etching the upper silicon layer of the substrate using the photoresist having the hemispherical mirror shape as the mask and forming a hemispherical mirror on the stage; and removing the photoresist.

BRIEF DESCRIPTION OF THE DRAWINGS

The above aspects and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 1:
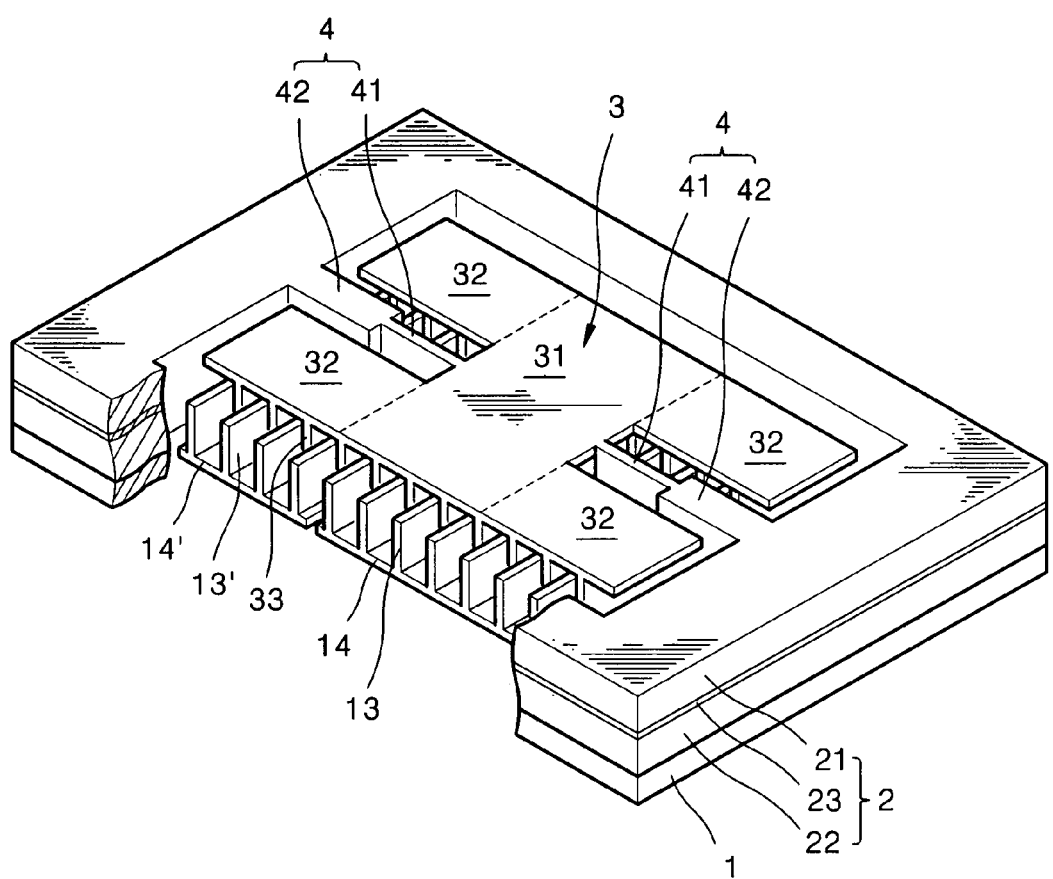
FIG. 1 is a schematic perspective view of an optical scanner disclosed in U.S. patent application No. 2003-39089.
Figure 2:
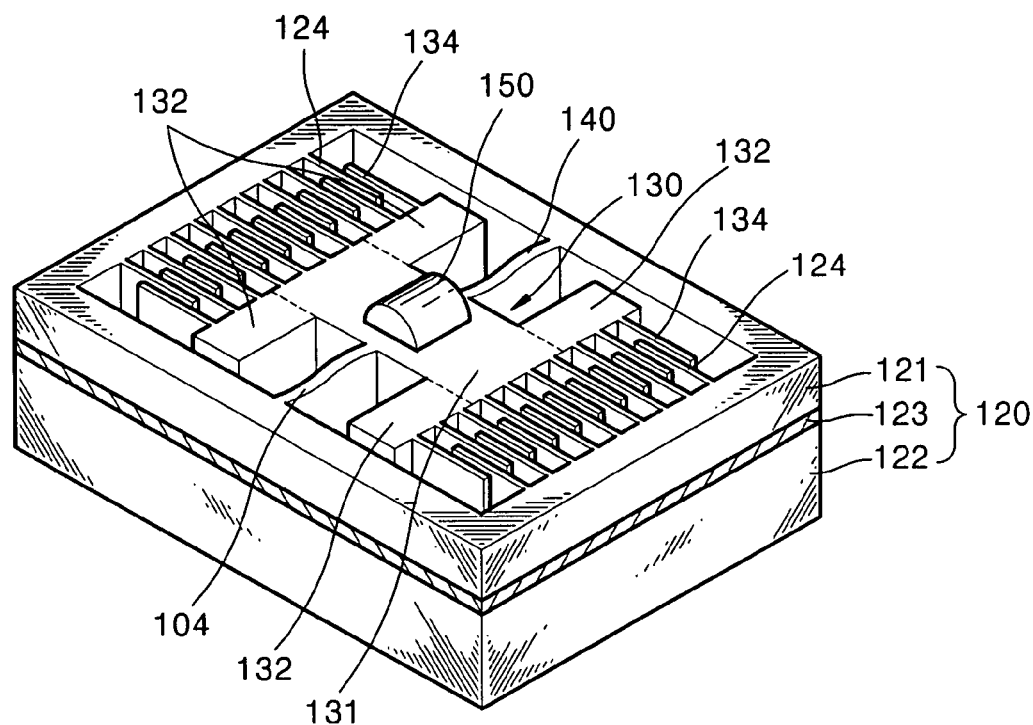
FIG. 2 is a schematic perspective view of an optical scanner according to a first embodiment of the present invention.
Figure 3:
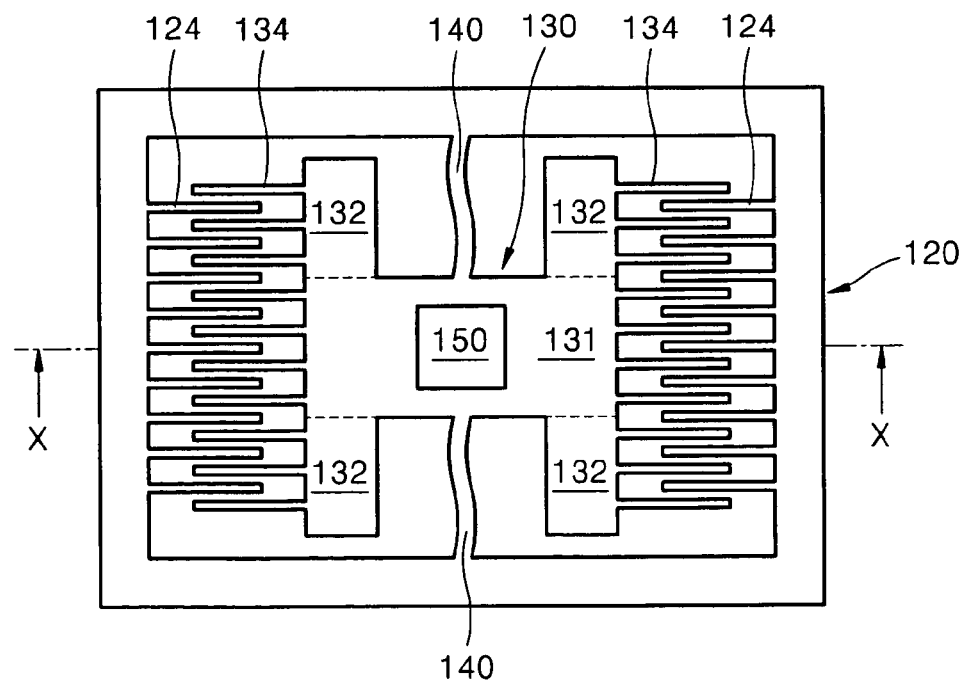
FIG. 3 is a schematic plan view of the optical scanner of FIG. 2.
Figure 4:
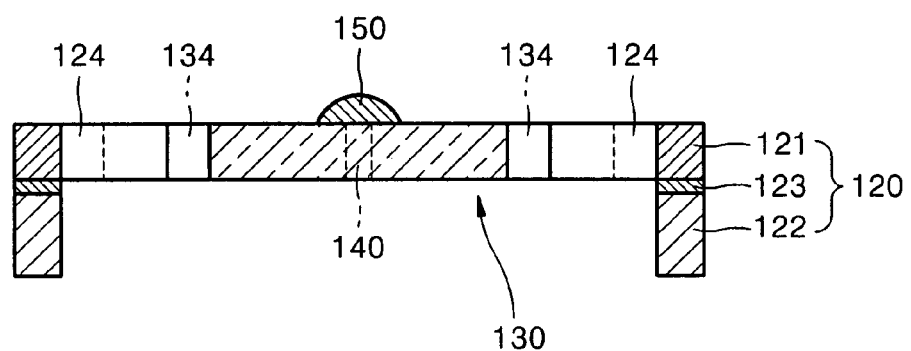
FIG. 4 is a cross-sectional view taken along line X—X of FIG. 3.

An optical scanner according to a first embodiment of the present invention will be described in detail with reference to FIGS. 2 through 4. FIG. 2 is a schematic perspective view of an optical scanner according to a first embodiment of the present invention. FIG. 3 is a schematic plan view of the optical scanner of FIG. 2. FIG. 4 is a cross-sectional view taken along line X—X of FIG. 3 and shows a cross-sectional structure of a stage 130 having a mirror 150 thereon and a frame 120.

Referring to FIGS. 2 through 4, a H-shaped stage 130 is positioned inside a rectangular frame 120. The stage 130 is supported inside the frame 120 and suspended at a predetermined height from the frame 120 by two support beams 140 positioned on a Y axis. A cylindrical mirror 150 is disposed on the stage 130. The mirror 150 is curved on a X axis, and a function thereof will be described later.

The support beam 140 extending from the frame 120 is a torsion bar that is deformed by the x-direction actuation of the stage 130. The torsion bar 140 is connected to a central portion of opposite sides of a central area 131 of the stage 130. The frame 120, the support beams 140, and the stage 130 form a single body. The torsion bars 140 support the linear actuation of the stage 130 and provide a properly elastic restoring force during the actuation of the stage 130, and the frame 120 and the support beams 140 provide an electric path to the stage 130. The torsion bar 140 is preferably formed in a S-shape to increase an elastic restoring force during deformation, thereby improving the driving speed of the stage 130.

It is preferable that the frame 120 is formed of a silicon on insulator (SOI) wafer. The frame 120 includes a first partial frame 121 formed of silicon in which moving portions, comb electrodes, and torsion bars are formed, an oxide 123, which is used as an etch stopper during dry etching so as to form the moving portions in a manufacturing process that will be described later, and a second partial frame 122 which suspends the moving portions from the bottom. The frame 120, the stage 130, and the support beams 140 are obtained from one material substrate, e.g., one SOI wafer, through a process that will be described later. Driving comb electrodes 134 are formed at outer sides of extended areas 132 that extend from the central area 131 of the stage 130, and fixed comb electrodes 124 are alternately disposed along with the driving comb electrodes 133 inside the frame 120 that faces the extended areas 132.

A symmetrical structure for driving the stage 130 by use of the driving comb electrodes 134 and the fixed comb electrodes 124 is provided at both sides of the support beams 140.

The cylindrical mirror 150 is formed by forming silver or aluminum coating on the surface thereof.

Figure 5:
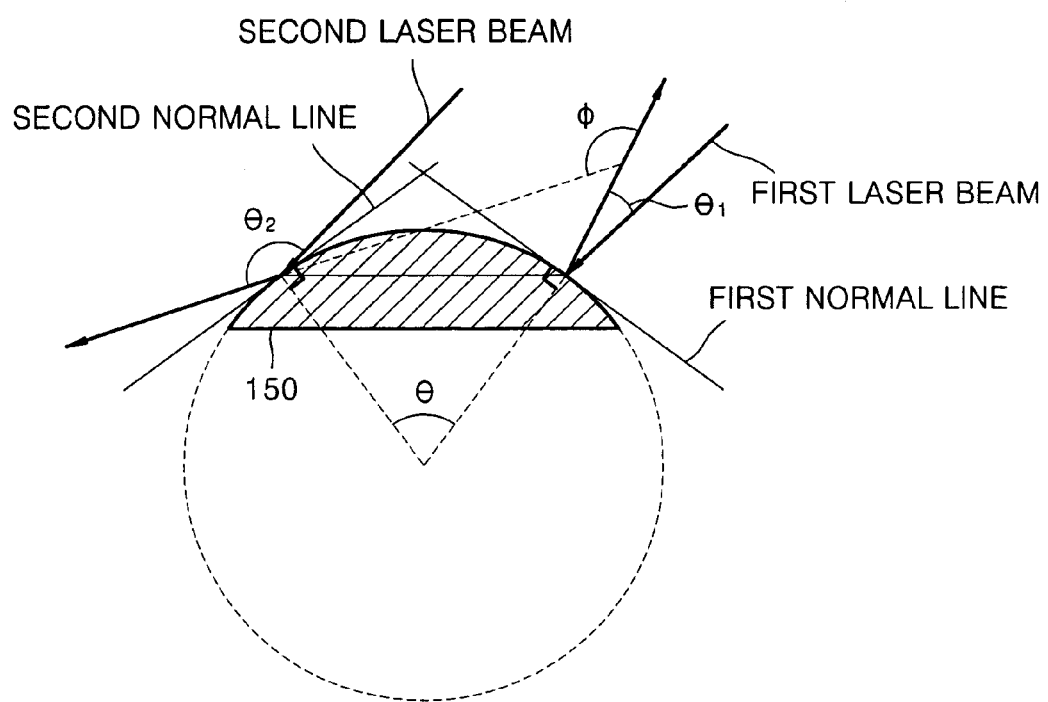
FIG. 5 shows a process of scanning light on an axis using the optical scanner according to the first embodiment of the present invention.

FIG. 5 shows a process of scanning light on an axis using the optical scanner according to the first embodiment of the present invention. Referring to FIG. 5, a cross-section of the cylindrical mirror 150 includes a part of an effective arc of a circle indicated by a dotted line. A radius of the circle may be r, and a central angle of the effective arc may be indicated by θ. The effective arc is a surface on which a laser beam is incident. When the mirror 150 is driven in a X-direction on the stage 130, the laser beam incident on both sides of the mirror 150 may be indicated by a first laser beam and a second laser beam. The reflection angles of laser beams incident on first and second normal lines are $\theta_1$ and $\theta_2$, respectively. Thus, a scan angle by use of the mirror 150 corresponds to an angle Φ and is given by Equation 1.

$$\Phi = \theta_2 - \theta_1 = 2\theta \quad (1)$$

Accordingly, the scan angle is determined by the central angle θ of the effective arc. In order to manufacture an optical scanner used in a scanning device having a scan angle of 30–40°, e.g., a projector, the angle of θ may be 15–20°.

Figure 6:
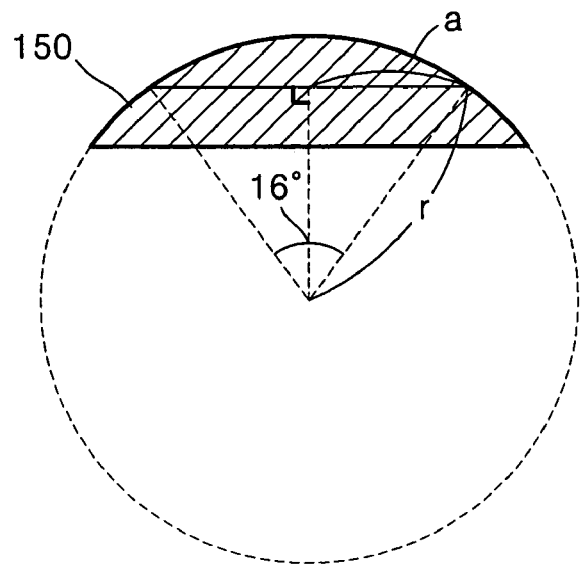
FIGS. 6 through 8 show the design of a curved mirror having a scan angle of 32° and a base length of an effective curved and reflecting surface of 1 mm.
Figure 7:
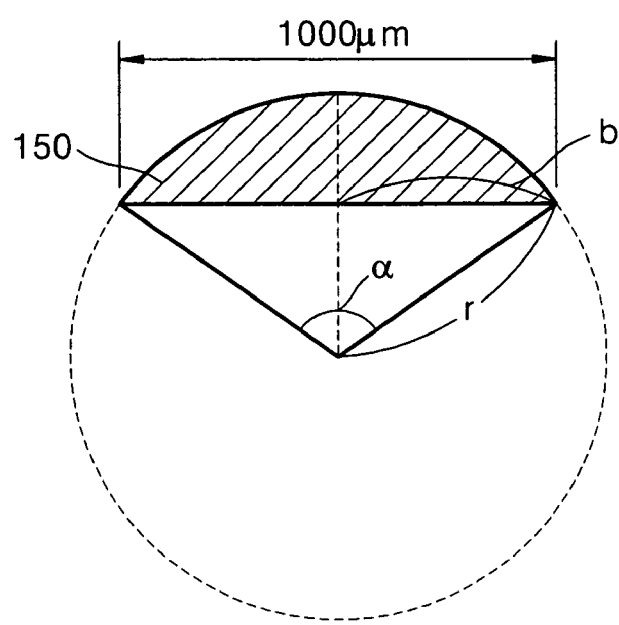
Figure 8:
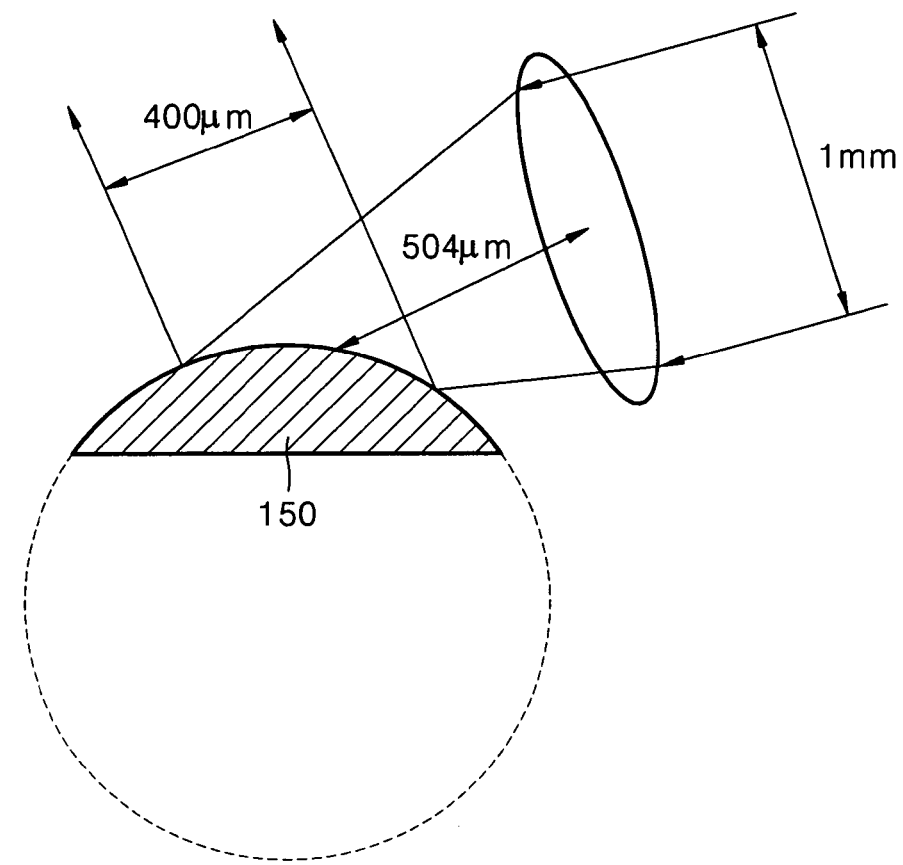

FIGS. 6 through 8 show the design of a mirror having a scan angle of 32° and a base length of an effective curved and reflecting surface of 1 mm. For explanatory clarity, angle and length have been exaggerated.

Referring to FIG. 6, an optical scan angle is 32°. Thus, the central angle of the effective arc is 16° by Equation 1. Assuming that the horizontal displacement of the curved mirror 150, that is, the length of a is 100 μm and a radius of a circle is r, the radius r is 719.4 μm, as given by Equation 2.

$$\sin 8° = a/r = 100/r \quad (2)$$

FIG. 7 shows the design of a cross-section of the cylindrical mirror 150. Referring to FIG. 7, when the base of the curved and reflecting surface is set to 1 mm, the length of b is 0.5 mm. An angle α of the base is 88°, as given by Equation 3.

$$\sin \frac{\alpha}{2} = b/r = 500/719.4 \quad (3)$$

FIG. 8 shows the design of a focusing lens for making the diameter of a reflecting laser beam 400 μm when the incident laser beam having a predetermined diameter, e.g., 1 mm on the reflecting surface.

Referring to FIG. 8, a central point of an incident beam is incident on one side of the effective arc of the curved mirror 150. In this case, to make a reflected beam parallel light, a focal length of the focusing lens should be 806 μm, and the focusing lens should be positioned at a point which corresponds to 504 μm from an incident point.

The optical scanner according to the first embodiment of the present invention moves the stage in the X-direction and scans the light at a wide angle, e.g., 30–40°, and thus can be used as a scanning device for a laser printer.

In the first embodiment, the torsion bars 140 are formed in a S-shape to increase a restoring force, the H-shaped stage is used to reduce an unnecessary portion of the stage to reduce load, and the comb electrodes are formed at long sides of the frame to increase an electrostatic force.

Figure 9:
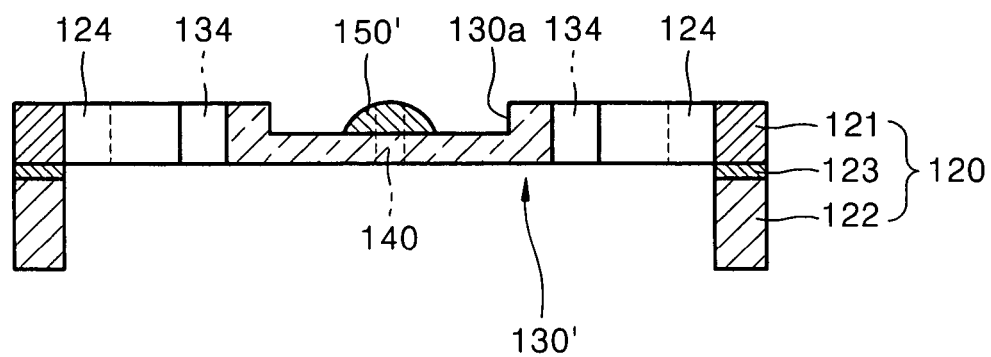
FIG. 9 is a cross-sectional view showing a modified example of the first embodiment.

FIG. 9 is a cross-sectional view showing a modified example of the first embodiment. Same reference numerals for elements that are substantially the same as the first embodiment have been used, and detailed descriptions thereof will be omitted.

Referring to FIG. 9, a groove 130a is formed at a stage 130' on which a curved mirror 150' is disposed. The curved mirror 150' is formed on the groove 130a so that a cylindrical mirror can be directly formed on a SOI wafer used to form an optical scanner without an additional substrate, as will be described later and a process of bonding the substrate and the SOI wafer required in the first embodiment can be omitted. Other elements and functions of the optical scanner according to the modified example are substantially the same as the optical scanner according to the first embodiment, and detailed descriptions thereof will be omitted.

Figure 10:
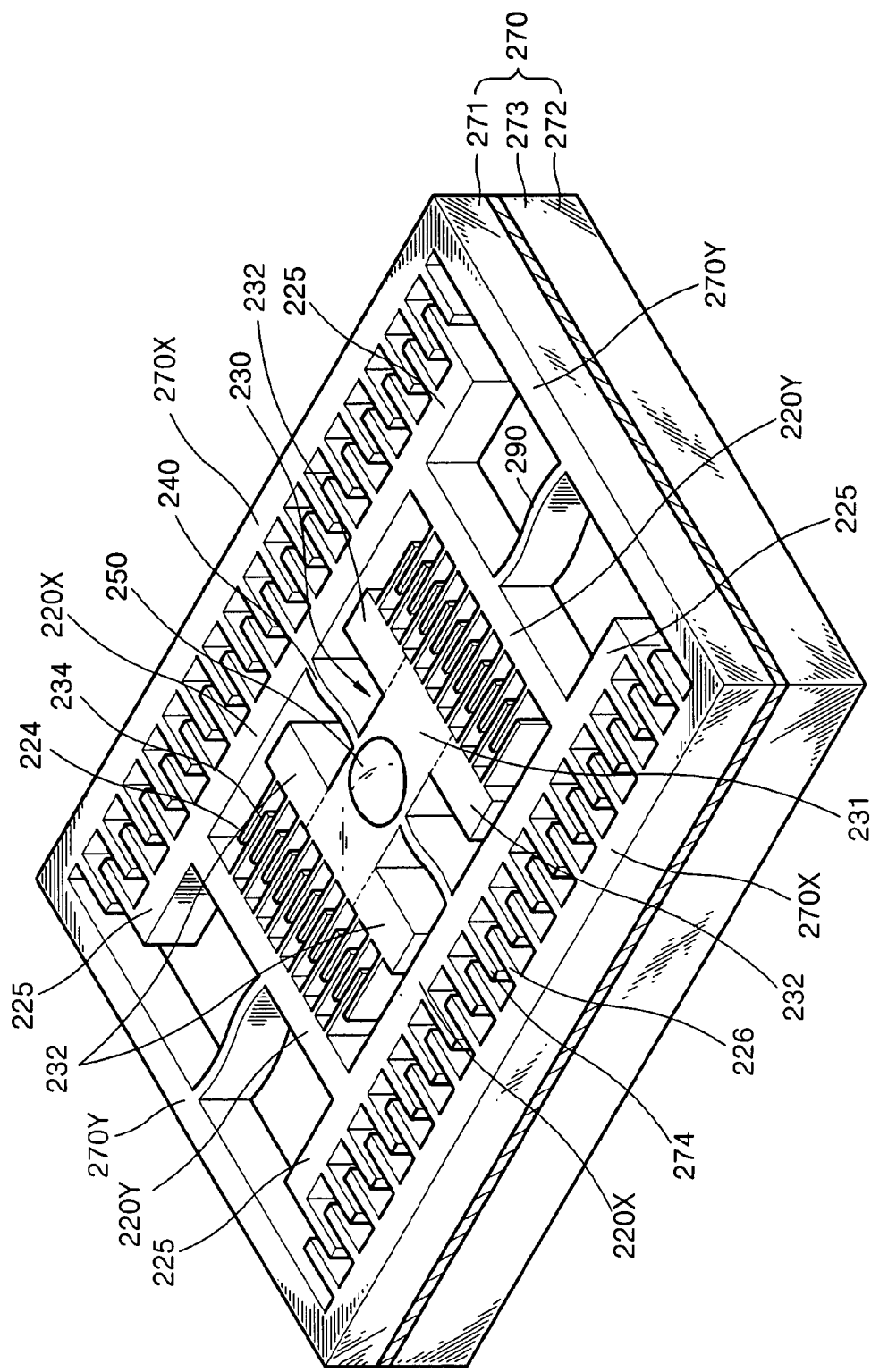
FIG. 10 is a schematic perspective view of an optical scanner according to a second embodiment of the present invention.
Figure 11:
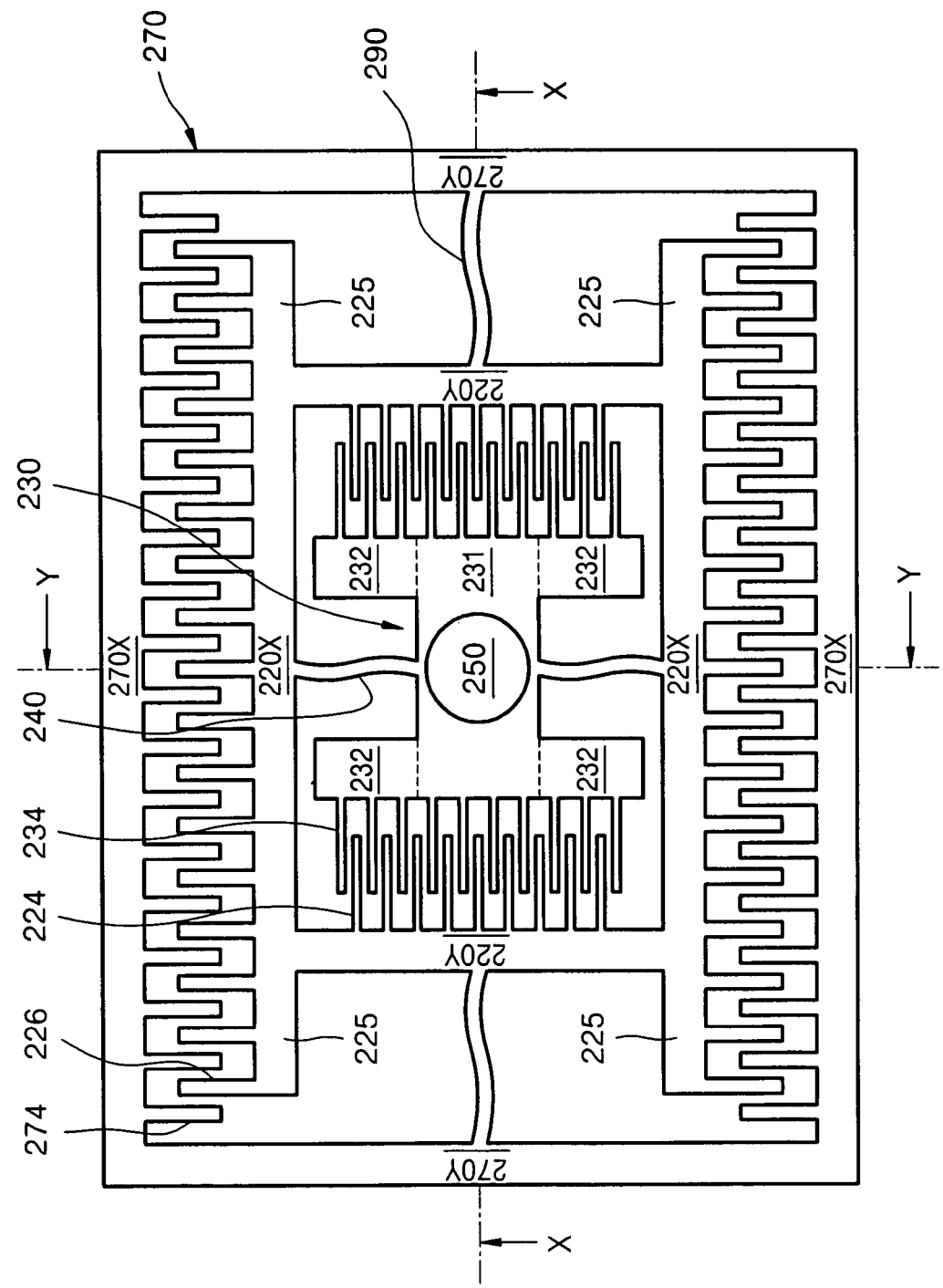
FIG. 11 is a plan view of FIG. 10.
Figure 12:
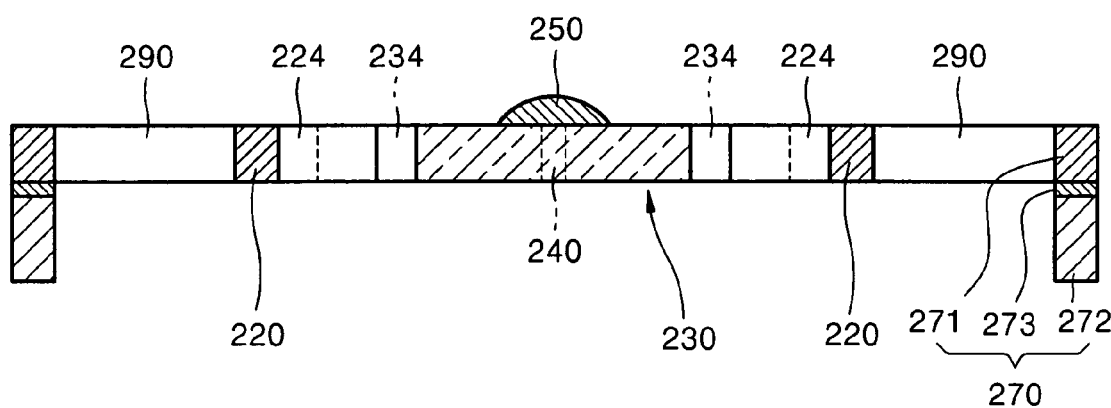
FIG. 12 is a cross-sectional view taken along line X—X of FIG. 11.
Figure 13:
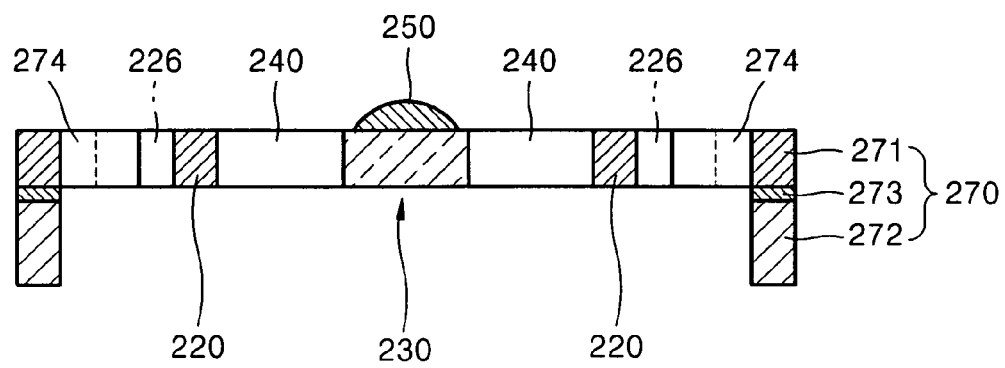
FIG. 13 is a cross-sectional view taken along line Y—Y of FIG. 11.

An optical scanner according to a second embodiment of the present invention will be described in detail with reference to FIGS. 10 through 13. FIG. 10 is a schematic perspective view of an optical scanner according to the second embodiment of the present invention. FIG. 11 is a plan view of FIG. 10, and FIGS. 12 and 13 are respectively a cross-sectional view taken along line X—X of FIG. 11 and a cross-sectional view taken along line Y—Y of FIG. 11.

Referring to FIGS. 10 through 13, a H-shaped stage 230 having a hemispherical mirror 250 formed on the surface of the stage 230 is supported by a first supporter having first torsion bars 240 and a rectangular moving frame 220 to be movable in a first direction (X-direction). The first supporter for supporting the stage 230 is supported by a second supporter having second torsion bars 290 and a rectangular fixed frame 270 to be movable in a second direction (Y-direction). Thus, the stage 230 is supported by the first and second supporters to be movable in a two-axis direction.

The rectangular driving frame 220 includes two first portions 220X extending parallel to a X-axis and a center thereof connected to the first torsion bar 240, and two second portions 220Y extending parallel to a Y-axis and a center thereof connected to the second torsion bar 290.

The stage 230 is supported at the moving frame 220 by a pair of the first torsion bar 240 positioned on the Y-axis. A hemispherical mirror 250 is disposed on the stage 230. A vertical cross-section of the mirror 250 has a predetermined arc, and the mirror 250 having the surface of the arc has the same effect as the principle of scanning light in the first direction in the first embodiment. Thus, the mirror 250 according to the second embodiment has the same effect as the principle of scanning light even in the second direction perpendicular to the first direction, and thus detailed descriptions thereof will be omitted.

The torsion bar 240 extends inward from the frame 220 and is deformed by the X-direction actuation of the stage 230. The torsion bars 240 are conneceted to central portions of opposite sides of a central area 231 of the stage 230. The frame 220, the first torsion bars 240, and the stage 230 form a single body. The torsion bars 240 support the linear X-direction actuation of the stage 230 and provide a properly elastic restoring force during the actuation of the stage 230, and the frame 220 and the first torsion bars 240 provide an electric path to the stage 230. It is preferable that the torsion bars 240 are formed in a S-shape and increase an elastic restoring force during deformation, thereby improving the driving speed of the stage 230.

First driving comb electrodes 234 are formed at outer sides of extended areas 232 that extend from the central area 231 in the stage 230, and first fixed comb electrodes 224 are alternately disposed along with the first driving comb electrodes 234 inside the frame 220 that faces the extended areas 232. A symmetrical structure for driving the stage 230 by using the first driving comb electrodes 234 and the first fixed comb electrodes 224 is provided at both sides of the support beams 240.

The rectangular fixed frame 270 surrounds the rectangular moving frame 220 and includes a first portion 270X that extends in the first direction (X-direction) and a second portion 270Y that extends in the second direction (Y-direction). The fixed frame 270 and the moving frame 220 are connected to the second torsion bars 290 positioned at the center between the second portions 220Y and 270Y. The second torsion bars 290 extend in the first direction (X-direction) so that the moving frame 220 is supported by the second torsion bars 290 to be movable in the second direction (Y-direction).

It is preferable that the fixed frame 270 is formed of a silicon on insulator (SOI) wafer. The fixed frame 270 includes a first partial frame 271 that is formed as a signal body with second fixed comb electrodes 274 and the second torsion bars 290 and supports them, an oxide 273, which is used as an etch stopper during dry etching so as to form the moving portions in a manufacturing process that will be described later, and a second partial frame 272 which suspends the moving portions from the bottom by a predetermined height.

A moving frame driving portion for moving the stage 230 and a moving frame 220 supporting the stage 230 in the Y-direction is disposed between the moving frame 220 and the fixed frame 270. Second driving comb electrodes 226 and second fixed comb electrodes 274 are alternately disposed along with one another on opposite surfaces of the first portion 220X of the moving frame 220 and the first portion 270X of the fixed frame 270.

The moving frame 220 extends in the X-direction. Thus, the second driving comb electrodes 226 are formed in extended portions 225 and the second fixed comb electrodes 274 are further formed in the fixed frame 270 corresponding to the moving frame 220 so that an electrostatic force is increased.

In the optical scanner according to the second embodiment of the present invention, a scanning operation performed by driving the hemispherical mirror 250 in the X-direction and the Y-direction is substantially the same as the above-described operation of the cylindrical mirror in a one direction, and thus detailed descriptions thereof will be omitted. The optical scanner according to the second embodiment moves the stage in both the X-direction and the Y-direction and scans the light at a wide angle, e.g., 30–40°, and thus can be used as a scanning device for a laser image device.

In the second embodiment, the torsion bars are formed in a S-shape to increase a restoring force, the H-shaped stage is used to reduce an unnecessary portion of the stage to reduce load, the comb electrodes are formed at long sides of the frame to increase an electrostatic force, thereby improving the driving speed of the stage.

The hemispherical mirror can be directly formed on a SOI wafer to form a scanner without an additional substrate as depicted in FIG. 9 which is the modified example of the first embodiment. Thus, a process of bonding the additional substrate and the SOI wafer to each other can be omitted. Other elements and functions of the optical scanner according to the modified example are substantially the same as the optical scanner according to the second embodiment, and detailed descriptions thereof will be omitted.

Hereinafter, a method of manufacturing the optical scanner having the above structure according to an embodiment of the present invention will be described stepwise. For understanding, drawings referred with the following descriptions are schematic compared to the above-described optical scanner according to the present invention, and the second embodiment will be exemplified.

Figure 14A:
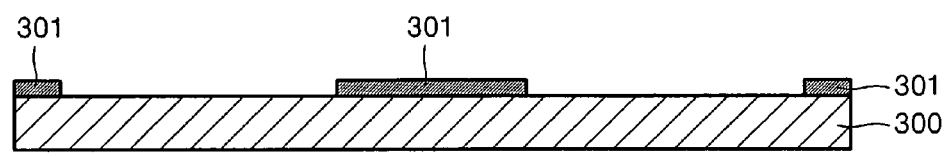
FIGS. 14A through 14L are cross-sectional views showing a process of manufacturing an optical scanner according to an embodiment of the present invention.

A) As shown in FIG. 14A, a first substrate 300 is provided. The first substrate 300 may be made of a Pyrex glass wafer having a thickness, e.g., about 300μm. An etching mask 301 is formed on the first substrate 300. The etching mask 301 is formed of a film which can withstand a process of etching the first substrate 300, in the shape of a stage and a second frame that will be described later.

Figure 14B:
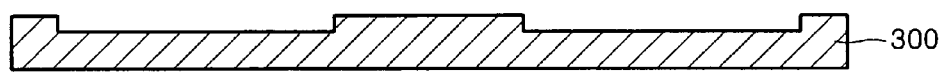

B) As shown in FIG. 14B, an exposed portion of the first substrate 300 which is not covered with the etching mask 301, is etched to a predetermined depth, and then the etching mask 301 is removed.

Figure 14C:
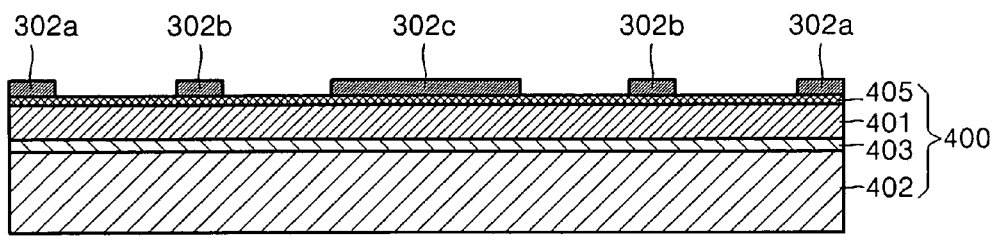

C) As shown in FIG. 14C, a silicon on insulator (SOI) wafer in which an oxide layer 403 is formed between wafers 401 and 402, is used as a second substrate 400. The oxide layer 403 is an etch stopper when forming moving portions. An oxide layer 405, e.g., a $SiO_2$ layer, is deposited on the second substrate 400. Then, an etching mask 302 having openings that correspond to areas between the moving portions is formed of a photoresist on the second substrate 400. Reference numerals 302a, 302b, and 302c are masks corresponding to a fixed frame, a moving frame, and a stage, respectively. For convenience, comb electrodes and torsion bars therebetween are not shown.

Figure 14D:
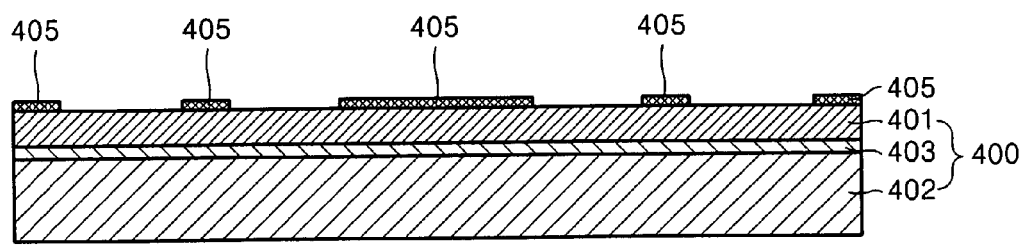

D) As shown in FIG. 14D, an exposed portion of the oxide layer 405 which is not covered with the etching mask 302, is dry etched, and then the etching mask 302 is removed.

Figure 14E:
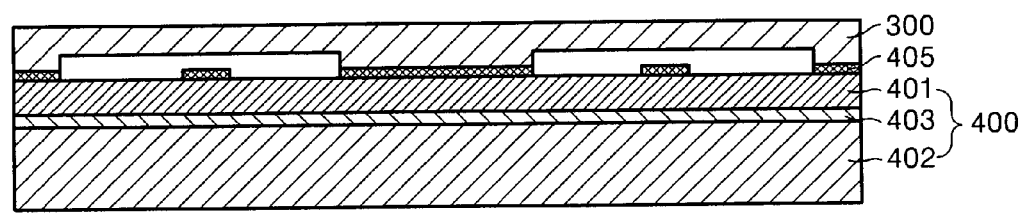

E) As shown in FIG. 14E, the first substrate 300 is bonded on the second substrate 400 by anodic bonding. The second substrate 400 is polished to a predetermined thickness, e.g., a thickness within a range of 50–100μm, by chemical mechanical polishing (CMP).

Figure 14F:
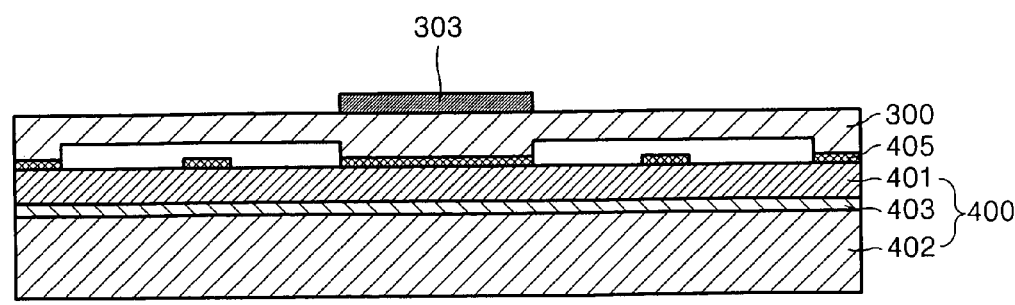

F) As shown in FIG. 14F, a photoresist is formed on a top surface of the first substrate 300. Then, the photoresist is patterned and a pattern 303 corresponding to a spherical mirror is formed.

Figure 14G:
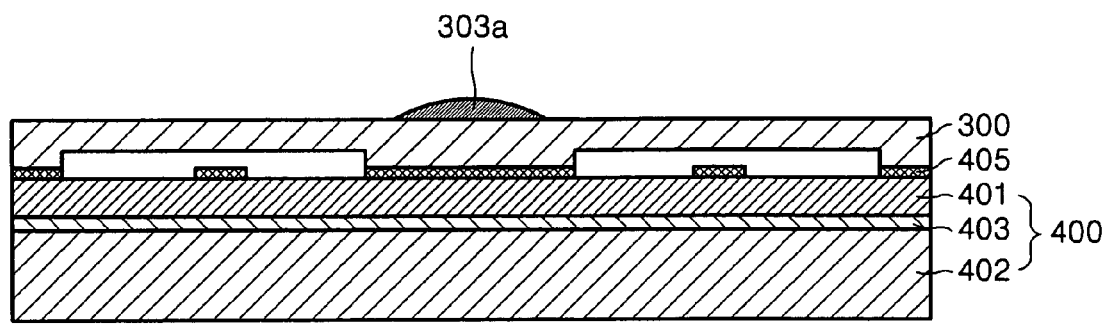

G) As shown in FIG. 14G, the pattern 303 is formed as a spherical mirror shape 303a by a thermal reflow process.

Figure 14H:
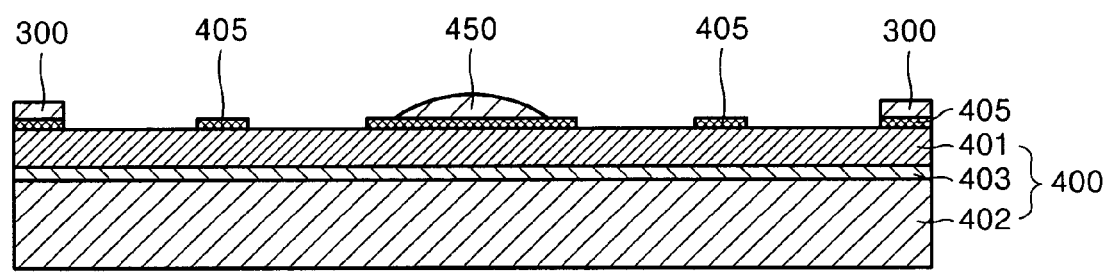

H) As shown in FIG. 14H, the first substrate 300 is dry etched, and then a spherical mirror 450 is formed on the oxide layer 405 having the shape of a stage.

Figure 14I:
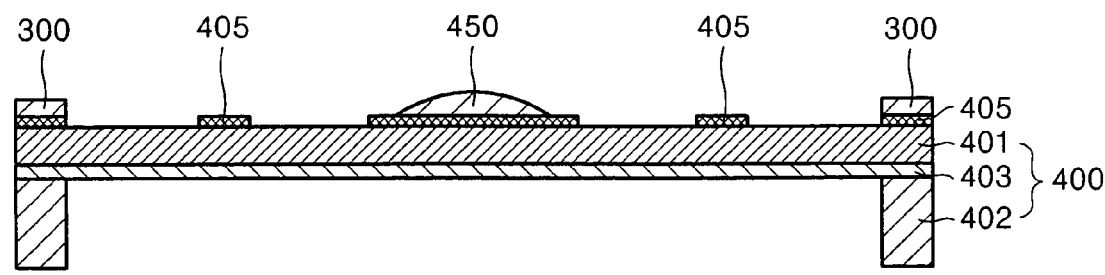

I) As shown in FIG. 14I, a photoresist (not shown) corresponding to a second frame is patterned on a rear surface of the second substrate 400, a lower silicon layer 402 is etched using tetramethylammonium hydroxide (TMAH) using the photoresist as a mask, and then the photoresist is removed. In this case, the oxide layer 403 is used as an etch stopper.

Figure 14J:
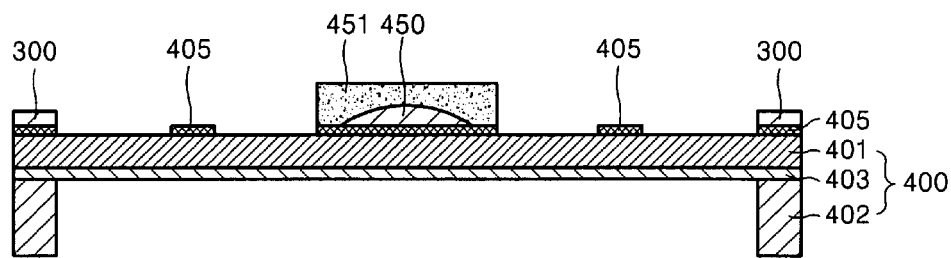

J) As shown in FIG. 14J, the photoresist which covers the spherical mirror 450, is coated on the second substrate 400, the photoresist is patterned, and then a protective layer 451 which covers the spherical mirror 450, is formed.

Figure 14K:
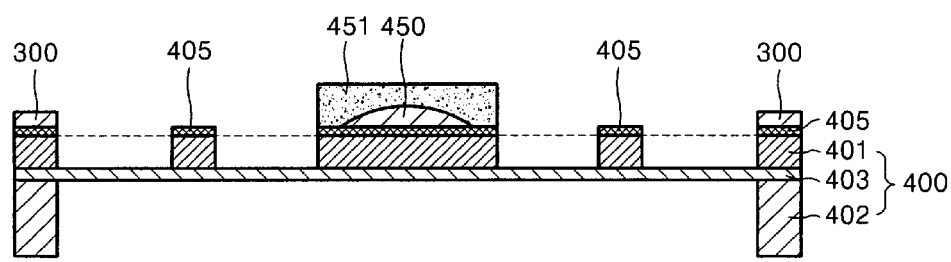

K) As shown in FIG. 14K, portions of the second substrate 400 which are not covered with the oxide layer 405 are etched up to the oxide layer 403 by inductively coupled plasma reactive ion etching (ICPRIE) to form a fixed frame, a moving frame, a stage, comb electrodes(not shown), and torsion bars (not shown).

Figure 14L:
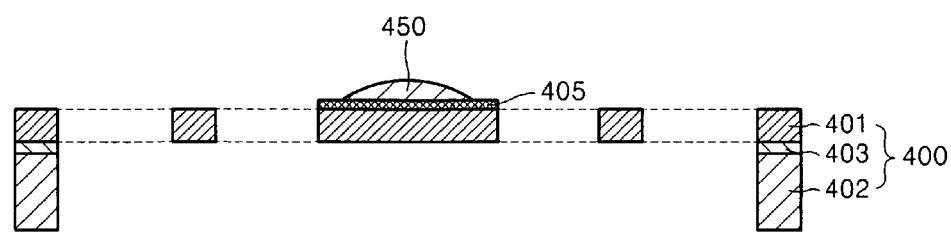

L) As shown in FIG. 14L, the protective layer 451 on the spherical mirror 450 is removed, and the oxide layers 403 and 405 and a remaining portion of the first substrate 300 are removed by wet etching.

M) In a device (resultant structure) which has undergone the above processes, a reflective layer formed of Au is coated on a surface of the spherical mirror 450.

The above-described process has been focused on the fabrication of one device. However, the device can generally be fabricated in a wafer unit process for obtaining a plurality of devices for one wafer. Additional processes may be performed while processing many devices in each wafer, and dicing is necessarily performed to make the devices from the wafer. Since the driving comb electrodes, etc. may be damaged during the dicing process, a protective layer can be formed on the driving comb electrodes before the dicing process to protect the driving comb electrodes. After the dicing is completed, the protective layer is finally removed. The additional processes do not limit the scope of the present invention.

Hereinafter, a method of manufacturing the optical scanner having the above structure according to another embodiment of the present invention will be described stepwise. For understanding, drawings referred with the following descriptions are schematic compared to the above-described optical scanner according to the present invention, and the second embodiment will be exemplified.

Figure 15A:
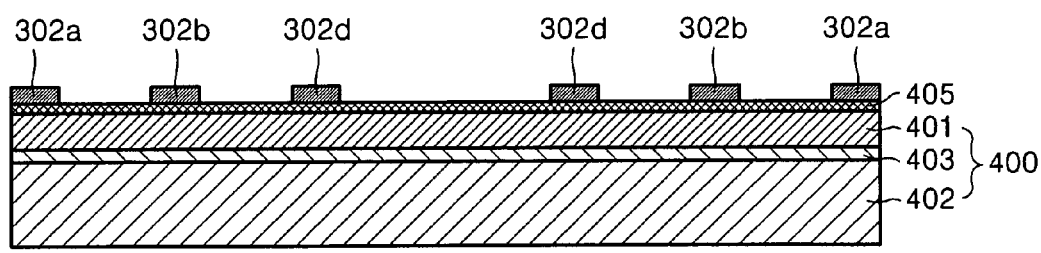
FIGS. 15A through 15K are cross-sectional views showing a process of manufacturing an optical scanner according to another embodiment of the present invention.

A) As shown in FIG. 15A, a silicon on insulator (SOI) wafer in which an oxide layer 403 is formed between wafers 401 and 402, is used as a substrate 400, so as to use the oxide layer 403 as an etch stopper when forming moving portions. An oxide layer 405, e.g., a $SiO_2$ layer, is deposited on the substrate 400. Then, an etching mask 302 having openings that correspond to areas between the moving portions is formed of a photoresist on the substrate 400. Reference numerals 302a, 302b, and 302d are masks corresponding to a fixed frame, a moving frame, and a stage, respectively. For convenience, comb electrodes and torsion bars therebetween are not shown.

Figure 15B:
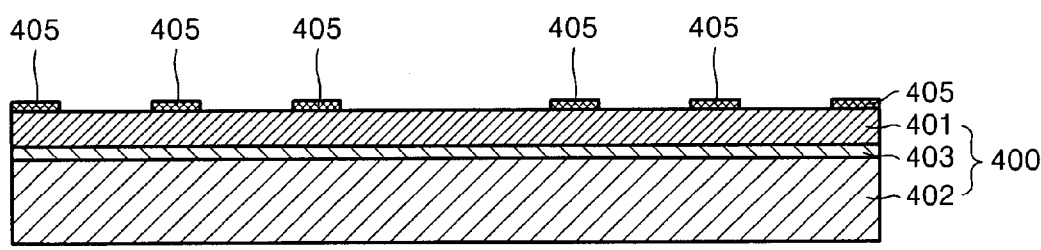

B) As shown in FIG. 15B, an exposed portion of the oxide layer 405 which is not covered with the etching mask 302, is dry etched, and then the etching mask 302 is removed.

Figure 15C:
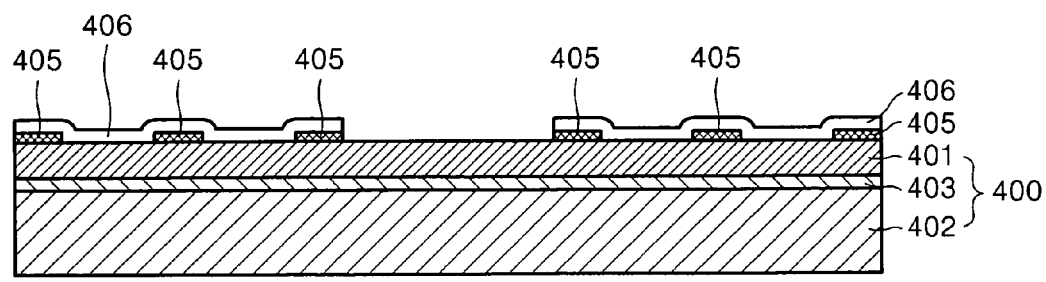

C) As shown in FIG. 15C, a silicon nitride layer 406 is formed on the substrate 400, and a mask (not shown) is formed on a portion of the silicon nitride layer 406 to expose a central area corresponding to a spherical mirror, and the exposed portion of the silicon nitride layer 406 is etched, and then the mask 302 is removed.

Figure 15D:
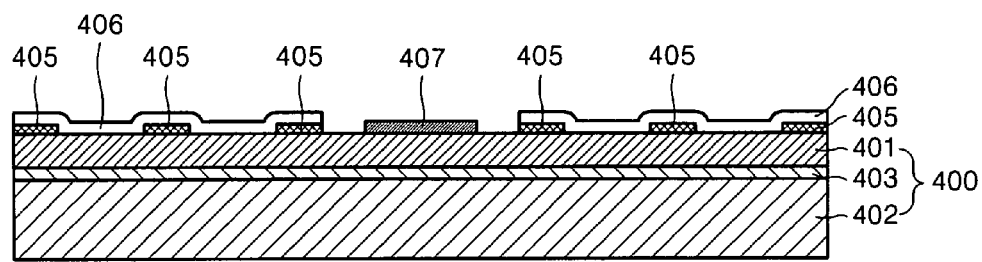

D) As shown in FIG. 15D, a photoresist is formed on a surface of the substrate 400. Then, the photoresist is patterned, and the patterned photoresist 407 is formed on an area corresponding to the spherical mirror.

Figure 15E:
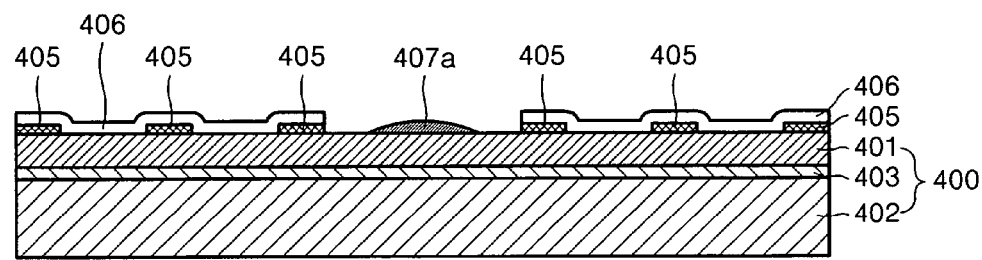

E) As shown in FIG. 15E, the photoresist 407 patterned in the shape of the spherical mirror is formed as a spherical mirror shape 407a by a thermal reflow process.

Figure 15F:
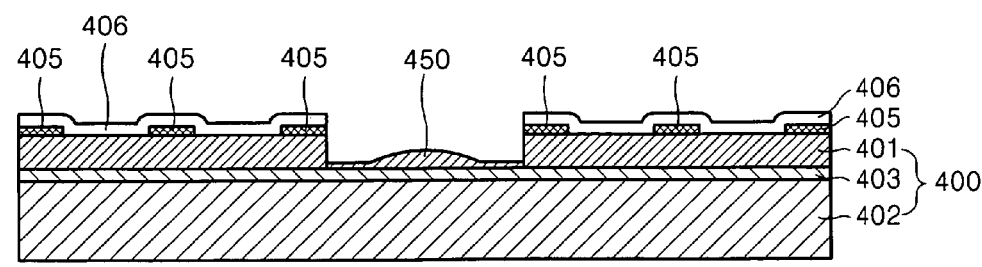

F) As shown in FIG. 15F, the silicon layer 401 exposed by the nitride layer 406 is dry etched, and the spherical mirror 450 is formed.

Figure 15G:
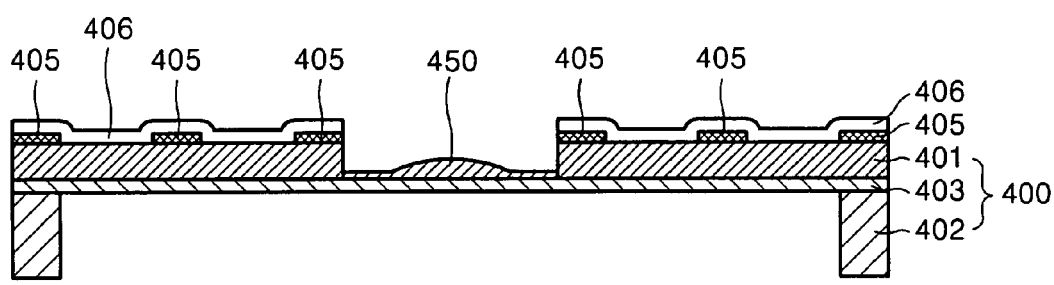

G) As shown in FIG. 15G, a photoresist (not shown) corresponding to a fixed frame is patterned and is formed on a rear surface of the substrate 400, and the silicon layer 402 is etched using tetramethylammonium hydroxide (TMAH) using the photoresist as a mask. In this case, the $SiO_2$ layer 403 is used as an etch stopper. The patterned photoresist is removed.

Figure 15H:
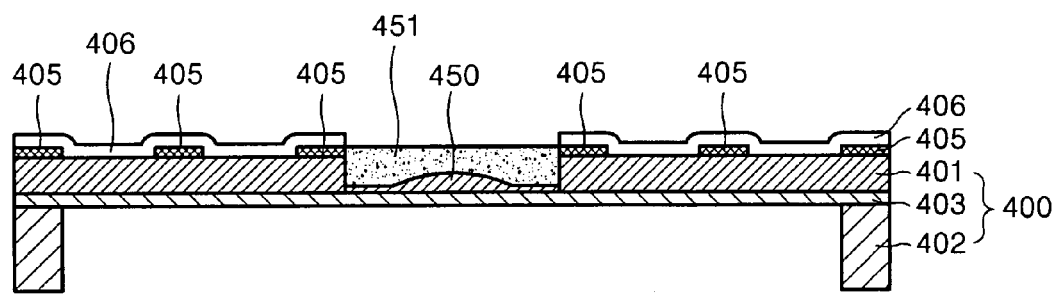

H) As shown in FIG. 15H, a protective layer which covers the spherical mirror 450, is coated on the substrate 400, the photoresist is patterned, and then a protective layer 451 which covers the spherical mirror 450, is formed.

Figure 15I:
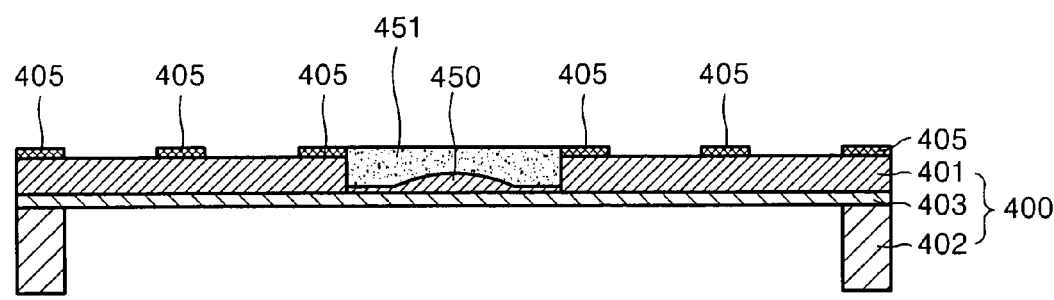

I) As shown in FIG. 15I, the silicon nitride layer 406 on the substrate 400 is removed.

Figure 15J:
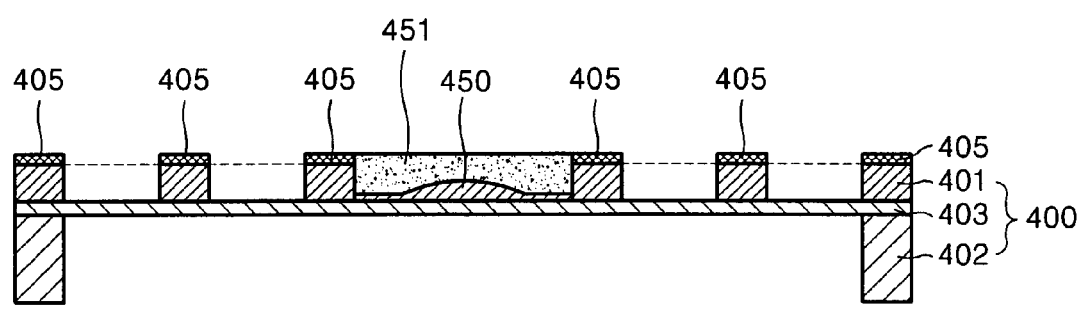

J) As shown in FIG. 15J, portions of the substrate 400 which are not covered with the mask 405 are etched up to the oxide layer 403 by inductively coupled plasma reactive ion etching (ICPRIE) to form a first frame, a second frame, a stage, comb electrodes (not shown), driving comb electrodes (not shown), a frame (not shown), and torsion bars (not shown).

Figure 15K:
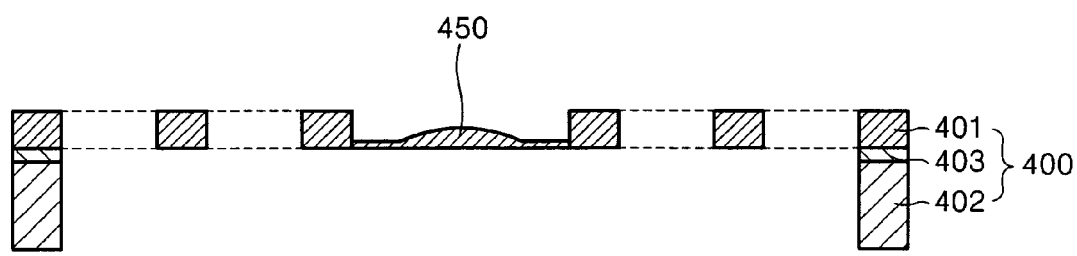

K) As shown in FIG. 15K, the protective layer 451 on the spherical mirror 450 is removed, and the SiO$_2$ layers 403 and 405 are removed by wet etching.

L) In a device (resultant structure) which has undergone the above processes, a reflective layer formed of Au is coated on a top surface of the spherical mirror 450.

The method of manufacturing the optical scanner using the above-described method of forming the spherical mirror uses only one SOI wafer, and thus, a manufacturing process is simplified.

The above-described process has been focused on the fabrication of one device. However, the device can generally be fabricated in a wafer unit process for obtaining a plurality of devices for one wafer. Additional processes may be performed while processing many devices in each wafer, and dicing is necessarily performed to make the devices from the wafer. Since the driving comb electrodes, etc. may be damaged during the dicing process, a protective layer can be formed on the driving comb electrodes before the dicing process to protect the driving comb electrodes. After the dicing is completed, the protective layer is finally removed. The additional processes do not limit the scope of the present invention.

As described above, the optical scanner according to the present invention horizontally moves a spherical mirror disposed on a stage and scans a laser beam incident on the spherical mirror at a wide angle of 30–40°, and thus can be used as a scanning device for a laser beam, e.g., a laser image device. In addition, torsion bars are formed in a S-shape to increase a restoring force, a H-shaped stage is used to reduce unnecessary portions of the stage and to reduce load, and the comb electrodes are further formed at long sides of the frame to increase an electrostatic force.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical scanner comprising:
   a rectangular frame;
   a H-shaped stage, which is linearly driven in a second direction perpendicular to a first direction of a central axis inside the frame and includes a central portion and four extended areas that extend from opposite sides of the central portion parallel to the central axis;
   a cylindrical mirror, which is disposed on the central area and scans a laser beam incident on the surface thereof in the second direction when the stage is linearly driven in the second direction;
   torsion bars, which are disposed on the central axis and support the stage by connecting the frame and the central portion of the stage; and
   a stage driving structure, which includes driving comb electrodes formed at opposite sides of the stage and fixed comb electrodes formed at corresponding sides of the frame, wherein the driving comb electrodes and the fixed comb electrodes are parallel to the second direction.

2. The optical scanner of claim 1, wherein the torsion bars have a S-shape.

3. The optical scanner of claim 1, wherein the torsion bars form a single body with the frame and the stage.

4. The optical scanner of claim 1, wherein the cylindrical mirror includes a surface with an effective arc having a central angle θ, and when light is incident on between both ends of the effective arc, the cylindrical mirror scans the light at an angle twice the central angle θ.

5. The optical scanner of claim 4, wherein the effective arc is disposed along the second direction.

6. The optical scanner of claim 1, wherein a groove is formed in a portion of the central area of the stage, and the mirror is disposed on the groove.

7. An optical scanner comprising:
   a H-shaped stage, which is linearly driven in a second direction perpendicular to a first direction of a central axis and includes a central portion positioned in a direction of the central axis and four extended areas that extend from opposite sides of the central portion parallel to the central axis;
   a first supporter, which supports the linear actuation of the stage and includes a pair of first torsion bars that extend from the stage in the first direction, and a rectangular moving frame having a pair of first portions parallel to the first torsion bars and a pair of second portions that extend in the second direction;
   a stage driving structure, which includes first driving comb electrodes formed at opposite sides of the stage and first fixed comb electrodes formed at corresponding sides of the second portions;
   a second supporter, which includes a pair of second torsion bars that extend outward from each of the second portions of the first supporter in the second direction, and a rectangular fixed frame having a pair of first portions to which the second torsion bars are respectively connected and a pair of second portions that extend in the second direction;
   a second supporter driving portion, which includes second driving comb electrodes extending outward from the first portions of the moving frame and second fixed comb electrodes positioned to correspond to the second driving comb electrodes at corresponding sides of the second portion of the fixed frame; and
   a hemispherical mirror, which is disposed on the central portion of the stage and scans a laser beam incident thereon in the first and second directions.

8. The optical scanner of claim 7, wherein the first torsion bars have a S-shape.

9. The optical scanner of claim 7, wherein the second torsion bars have a S-shape.

10. The optical scanner of claim 7, wherein the hemispherical mirror scans an incident beam in the second direction when the stage is driven in the second direction, and scans the incident beam in the first direction when the first supporter is driven in the first direction.

11. The optical scanner of claim 7, wherein the first torsion bars form a single body with the stage and the first portions of the moving frame, and the second torsion bars form a single body with the moving frame and the first portions of the fixed frame.

12. The optical scanner of claim 7, wherein the hemispherical mirror includes a surface with an effective arc having a central angle θ, and when light is incident on between both ends of the effective arc, the cylindrical mirror scans the light at an angle twice the central angle θ.

13. The optical scanner of claim 7, wherein a groove is formed in a portion of the central area of the stage, and the mirror is disposed on the groove.

14. An optical scanner comprising:

a H-shaped stage, which is linearly driven in a second direction perpendicular to a first direction of a central axis inside the frame and includes a central portion and four extended areas that extend from opposite sides of the central portion parallel to the central axis;

a curved surface mirror, which is disposed on the central portion and scans a laser beam incident on the surface thereof in the second direction when the stage is linearly driven in the second direction;

torsion bars, which are disposed on the central axis and support the stage by connecting the frame and the central portion of the stage;

a stage driving structure, which includes driving comb electrodes formed at opposite sides of the stage and fixed comb electrodes formed at corresponding sides of the, wherein the driving comb electrodes and the fixed comb electrodes are parallel to the second direction.

* * * * *